United States Patent
Shishido

(10) Patent No.: US 9,752,685 B2
(45) Date of Patent: Sep. 5, 2017

(54) FLOW RATE CONTROL APPARATUS

(75) Inventor: Kenji Shishido, Adachi-ku (JP)

(73) Assignee: SMC KABUSHIKI KAISHA, Tokyo (JP)

(*) Notice: Subject to any disclaimer, the term of this patent is extended or adjusted under 35 U.S.C. 154(b) by 352 days.

(21) Appl. No.: 14/115,731

(22) PCT Filed: May 17, 2012

(86) PCT No.: PCT/JP2012/063239
§ 371 (c)(1),
(2), (4) Date: Nov. 5, 2013

(87) PCT Pub. No.: WO2012/161234
PCT Pub. Date: Nov. 29, 2012

(65) Prior Publication Data
US 2014/0077114 A1 Mar. 20, 2014

(30) Foreign Application Priority Data
May 20, 2011 (JP) .................. 2011-113633

(51) Int. Cl.
| F16K 1/04 | (2006.01) |
| F16K 1/06 | (2006.01) |
| F16K 1/42 | (2006.01) |
| F16K 1/52 | (2006.01) |

(52) U.S. Cl.
CPC .............. F16K 1/06 (2013.01); F16K 1/04 (2013.01); F16K 1/42 (2013.01); F16K 1/523 (2013.01)

(58) Field of Classification Search
CPC ... F16K 27/02; F16K 1/42; F16K 1/38; F16K 1/04; F16K 1/06; F16K 1/523
(Continued)

(56) References Cited

U.S. PATENT DOCUMENTS 5,004,011 A * 4/1991 Linder .................. F16K 1/523
137/556
5,156,188 A * 10/1992 Wakita .................... F16K 1/36
137/625.3
(Continued)

FOREIGN PATENT DOCUMENTS

EP  0 050 028 A1  4/1982
JP  3-117182 U  12/1991
(Continued)

OTHER PUBLICATIONS

U.S. Appl. No. 29/507,598, filed Oct. 29, 2014, Shishido.
(Continued)

*Primary Examiner* — Michael R Reid
*Assistant Examiner* — Patrick Williams
(74) *Attorney, Agent, or Firm* — Oblon, McClelland, Maier & Neustadt, L.L.P.

(57) ABSTRACT

A flow rate control apparatus includes a valve mechanism capable of controlling a flow rate of a pressure fluid that flows from a second port to a first port. Second stopper walls are formed on a seating section of a needle valve constituting the valve mechanism and which is capable of advancing and retracting in an axial direction. In addition, in a total valve-closed state when the seating section of the needle valve is seated on a seat of a first body, the second stopper walls come into abutment and are stopped in a circumferential direction of the needle valve with respect to first stopper walls of the first body.

7 Claims, 6 Drawing Sheets

(58) Field of Classification Search
USPC ....... 251/121, 218, 264, 221–224, 324, 267, 251/268, 325; 137/625.3
See application file for complete search history.

(56) References Cited

U.S. PATENT DOCUMENTS

| | | | | |
|---|---|---|---|---|
| 5,851,003 | A * | 12/1998 | Aoki | F16K 31/04 251/129.11 |
| 8,025,268 | B2 * | 9/2011 | Masamura | F16K 7/16 251/267 |
| 2011/0309284 | A1 * | 12/2011 | Yamada | F16K 1/04 251/324 |

FOREIGN PATENT DOCUMENTS

| | | |
|---|---|---|
| JP | 2001-141090 A | 5/2001 |
| JP | 2001-173835 | 6/2001 |
| JP | 2006-153140 | 6/2006 |
| JP | 4292233 | 4/2009 |
| RU | 2 373 448 C2 | 11/2009 |
| WO | 2010 109690 | 9/2010 |

OTHER PUBLICATIONS

Japanese Office Action issued Dec. 17, 2013, in Japan Patent Application No. 2011-113633 (with Partial English translation).
Written Opinion of the International Searching Authority Issued Jul. 24, 2012 in PCT/JP12/063239 Filed May 17, 2012.
International Search Report Issued Jul. 24, 2012 in PCT/JP12/063239 Filed May 17, 2012.
Resolution on Granting Patent for Invention issued Jun. 29, 2015 in Russian Patent Application No. 2013149484 (with English Translation).

* cited by examiner

FLOW RATE CONTROL APPARATUS

TECHNICAL FIELD

The present invention relates to a flow rate control apparatus, which is capable of controlling the flow rate of a fluid that flows between a pair of ports, by displacing a rod having a valve member in an axial direction.

BACKGROUND ART

Heretofore, a flow rate control apparatus has been known, which is connected by piping to a fluid pressure device such as a cylinder or the like, and which is capable of controlling operation of the fluid pressure device by adjusting the flow rate of a fluid, which is supplied to and discharged from the fluid pressure device. Such a flow rate control apparatus, for example, as disclosed in Japanese Patent No. 4292233, is equipped with a body having ports therein, and a needle valve that is screw-engaged with respect to the body. By rotation of the needle valve and displacement thereof in the axial direction, the flow rate of a fluid that flows between the body and a tapered needle provided on an end of the needle valve is controlled, whereby the fluid is made to flow from one of the ports to the other port.

SUMMARY OF INVENTION

With the above-described flow rate control apparatus, in general, both the body and the needle valve are formed from a metal material. With the aim of reducing the weight of the flow rate control apparatus, there has been a demand to form the body and the needle valve, for example, from a resin material. However, if the body and the needle valve are formed from a resin material, when the needle valve is displaced downward to come into abutment with respect to a valve seat of the body to put the needle valve in a closed state, there is a concern that the valve seat may become deformed (collapsed) and worn, as a result of being pressed in an axial direction by the needle valve. Along therewith, it is considered that the durability of the flow rate control apparatus will be decreased.

Furthermore, accompanying deformation and frictional wearing of the body, the seated position (abutment position) of the needle valve with respect to the valve seat changes, such that the movement amount in the axial direction also changes in accordance with changes in the completely closed position of the needle valve. As a result, control of the flow rate of the pressure fluid by the flow rate control apparatus cannot be performed with high accuracy.

A general object of the present invention is to provide a flow rate control apparatus, which is capable of controlling with high accuracy the flow rate of a fluid, and of making the flow rate control apparatus lighter in weight.

The present invention is a flow rate control apparatus, which is capable of controlling the flow rate of a fluid that flows between a pair of ports, by displacement of a rod having a valve member thereon in an axial direction, comprising:

a body having the ports and a seat on which the valve member is seated, the rod being screw-engaged rotatably in the body; and a stopper means disposed on the body and the rod, and which regulates rotational displacement of the rod in a valve-closed state in which the valve body is seated on the seat, wherein the body and the rod are both formed from a resin material.

According to the present invention, the rod is disposed rotatably by screw-engagement with respect to the body, whereby the rod is rotated and displaced in an axial direction. In a closed state in which the valve member is seated on the seat of the body, rotational displacement of the rod is regulated by the stopper means, such that further displacement thereof in the axial direction is stopped.

Consequently, in the valve-closed state, as a result of rotation of the rod being regulated by the stopper means, a thrust force generated in an axial direction upon rotation of the rod is not imposed with respect to the seat, and deformation of the seat when such a thrust force is applied can be prevented. Owing thereto, even in the case that the body and the rod are both formed from a resin material, which is lower in hardness than a metal material, deformation of the body including the seat thereof can reliably be prevented.

As a result, the flow rate of a fluid can be controlled stably and with high accuracy at all times, without detrimental changes in the valve-closed position of the rod caused by deformation of the seat.

Further, since the body and the rod can be formed from a resin material, compared to a case of forming the body and the rod from a metal material, the overall weight of the flow rate control apparatus can be reduced, i.e., the flow weight control apparatus can be made lighter in weight.

The above and other objects, features, and advantages of the present invention will become more apparent from the following description when taken in conjunction with the accompanying drawings in which a preferred embodiment of the present invention is shown by way of illustrative example.

DESCRIPTION OF EMBODIMENTS

Figure 1:
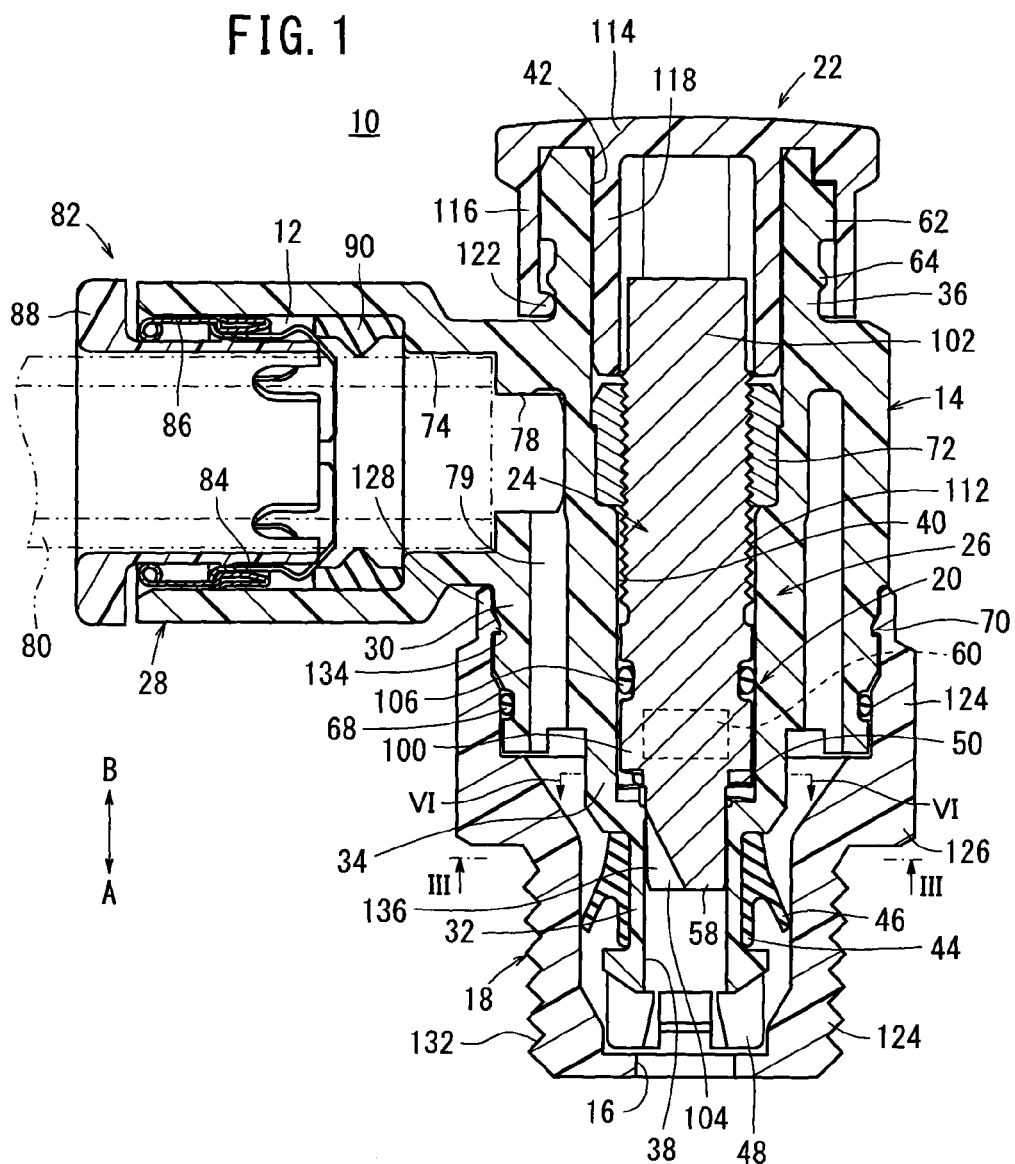
FIG. 1 is an overall cross sectional view of a flow rate control apparatus according to an embodiment of the present invention.
Figure 2:
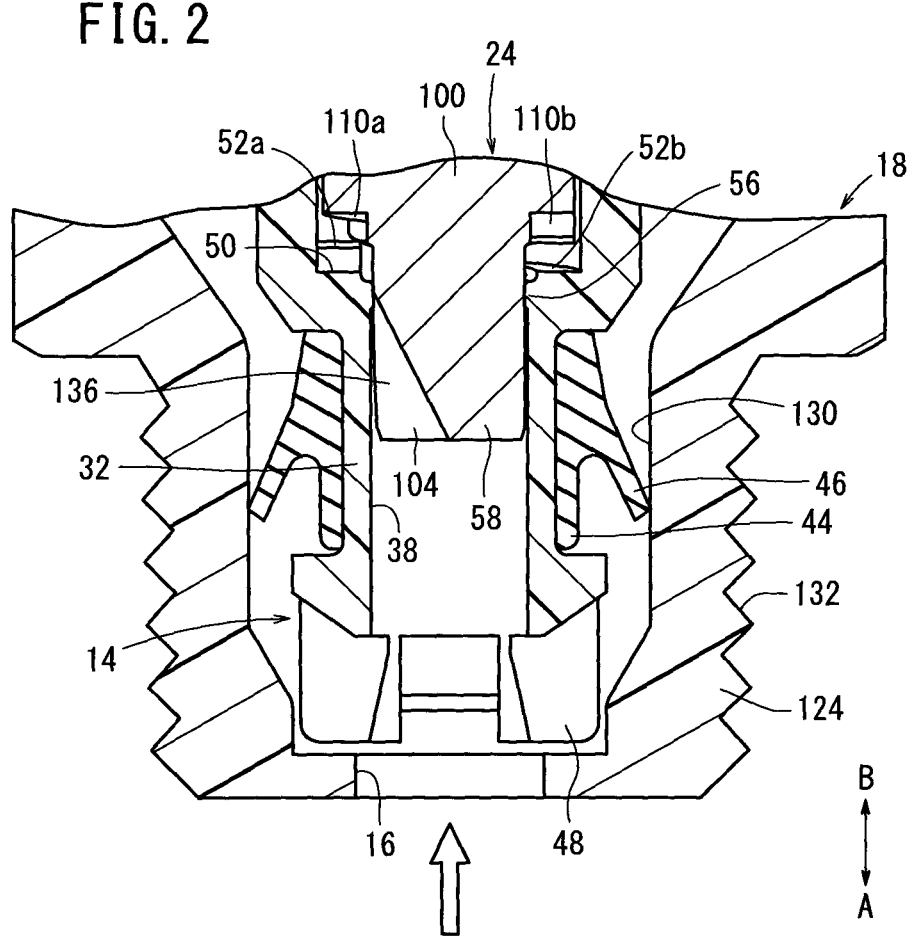
FIG. 2 is an enlarged view showing the vicinity of a control member of a needle valve in the flow rate control apparatus of FIG. 1.
Figure 3:
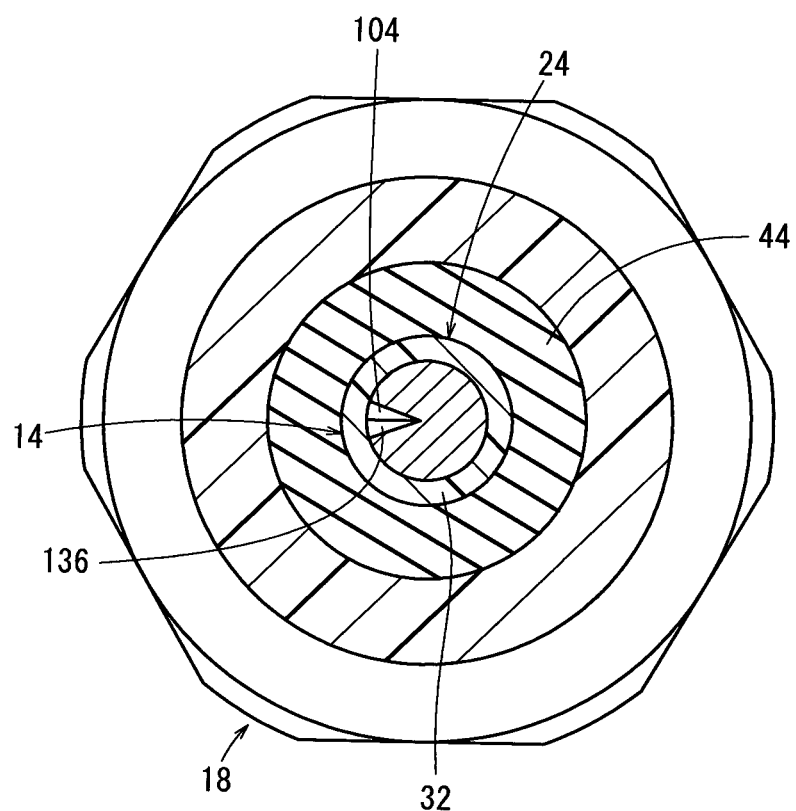
FIG. 3 is a cross sectional view taken along line III-III of FIG. 1.

As shown in FIGS. 1 through 3, the flow rate control apparatus 10 includes a first body 14 having a first port 12 to which a pressure fluid is supplied, a second body 18 having a second port 16 from which the pressure fluid is discharged and which is attached to the first body 14, a valve mechanism 20 that controls a flow condition of the pressure fluid (e.g., pressurized air) that flows from the first port 12 to the second port 16, and a handle 22 for manually controlling a flow rate (flow amount) of the pressure fluid by the valve mechanism 20.

FIG. 1 shows a valve-closed state in which a passage between the first port 12 and the second port 16 is blocked by a needle valve (rod) 24 constituting part of the valve mechanism 20.

The first body 14 is made up from a main body portion 26, which is formed in a tubular shape, for example, from a resin material, and which extends a predetermined length along an axial direction (in the direction of arrows A and B), a connector 28 connected to a side of the main body portion 26 and having the first port 12 defined in the interior thereof, and a first coupling 30 formed on an outer circumferential side of the main body portion 26, and which is coupled to the second body 18.

The main body portion 26 is made up from a first tubular section 32 formed at a lower end thereof, a second tubular section 34 connected to an upper part of the first tubular section 32 and which is expanded in diameter with respect to the first tubular section 32, and a third tubular section 36 connected to an upper part of the second tubular section 34 and which is expanded in diameter with respect to the second tubular section 34. Through holes 38, 40, 42, which penetrate therethrough, are formed respectively in the interiors of the first through third tubular sections 32, 34, 36.

The first through third tubular sections 32, 34, 36 are formed such that outer diameters thereof become larger stepwise from the first tubular section 32 to the third tubular section 36. Similarly, the first through third through holes 38, 40, 42 are formed such that inner diameters thereof become larger stepwise corresponding to the first through third tubular sections 32, 34, 36, in order sequentially from the first through hole (hole) 38, the second through hole 40, and the third through hole 42. The first through hole 38 penetrates along the axial direction (in the direction of arrows A and B) at a substantially constant diameter. A portion of a needle valve 24 of the valve mechanism 20, to be described later, is inserted through the first through hole 38.

An annular check valve 44 is mounted via an annular groove on an outer circumferential surface of the first tubular section 32, the check valve 44 abutting against an inner wall surface of the second body 18 in which the first tubular section 32 is inserted. The check valve 44 is formed, for example, from an elastic material such as rubber or the like, and is substantially V-shaped in cross section opening in a downward direction. A flange portion 46, which is inclined in a radial outward direction from the outer circumferential surface of the check valve 44, abuts against the second body 18.

Further, a plurality of fins 48 are provided on a lower end of the first tubular section 32, which are separated at equal intervals along the circumferential direction, each of the fins 48 being formed with a predetermined width in a radial inward direction with respect to an outer circumferential surface of the first tubular section 32, and extending downwardly (in the direction of the arrow A) by a predetermined length. The fins 48, for example, include a rectifying function, and serve as a flow rectifier for rectifying the flow of a fluid that is supplied to the second port 16 and flows downstream therefrom.

Figure 4:
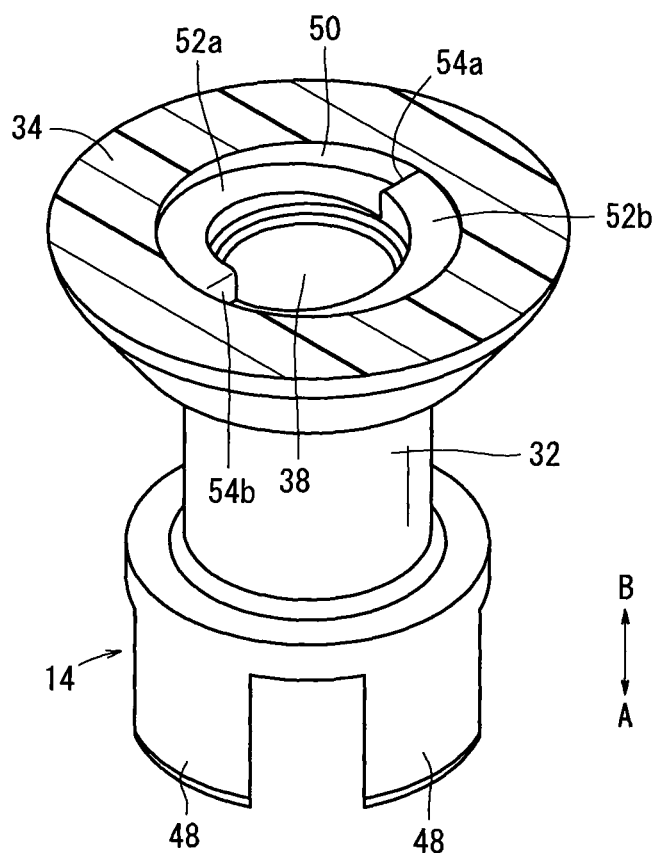
FIG. 4 is a perspective view, shown partially in cross section, of the vicinity of a first tubular section of a first body shown in FIG. 1.

An annular seat 50, which is expanded in diameter in a radial outward direction at a location bordering with the second tubular section 34, is formed on an upper part of the first tubular section 32. As shown in FIG. 4, the seat 50 extends perpendicularly to the axial direction of the first tubular section 32, and is formed with first spiral surfaces 52a, 52b on the upper surface thereof, which extend in spiral shapes along the axial direction (in the direction of arrows A and B). The seat 50 enables the needle valve 24 constituting the valve mechanism 20 to be seated thereon.

The first spiral surfaces 52a, 52b each have a predetermined width in the diametrical direction of the first tubular section 32. The first spiral surfaces 52a, 52b are inclined, for example, in a direction (the direction of the arrow A) to separate away from the second tubular section 34, while turning counterclockwise about the axis of the first tubular section 32, and are formed as a pair symmetrically about the axis.

At borders between one of the first spiral surfaces 52a and the other of the first spiral surfaces 52b, a pair of first stopper walls (first walls) 54a, 54b are formed respectively in an upstanding manner in the axial direction (the direction of arrows A and B) of the first tubular section 32. The first stopper walls 54a, 54b are disposed at respective positions on a straight line about the axis of the first body 14.

Stated otherwise, one of the first stopper walls 54a and the other of the first stopper walls 54b are disposed at respective positions separated by 180 degrees from each other along the circumferential direction of the first tubular section 32.

Further, a radially inward projecting guide member 56 (see FIG. 2) is formed on the inner circumferential surface of the first through hole 38, at a position on the side of the second through hole 40 (in the direction of the arrow B). The guide member 56 is formed in an annular shape, in sliding contact with an outer circumferential surface of a control section 58 on the needle valve 24. Additionally, the guide member 56 guides the needle valve 24 along the axial direction (in the direction of arrows A and B) when the needle valve 24 is displaced.

The second tubular section 34 is formed at a substantially central portion along the axial direction (in the direction of arrows A and B) of the main body portion 26, with the needle valve 24 (described later) constituting the valve mechanism 20 being inserted for displacement through the second through hole 40 in the interior of the second tubular section 34. A pair of communication holes 60 (see FIG. 1) are formed in the second tubular section 34 substantially perpendicular to the axis thereof, the communication holes 60 establishing communication between the exterior of the second tubular section 34 and the second through hole 40.

The communication holes 60 open with substantially rectangular shapes in cross section, and are formed on a straight line about the axis of the second tubular section 34 perpendicularly to the axis. The position of the communicating holes 60 is such that the communicating holes 60 are formed in the vicinity of the lower end of the later-described first coupling 30.

The first coupling 30 extends downwardly (in the direction of the arrow A). The third tubular section expands in diameter in a radial outward direction below a central portion along the axial direction of the third tubular section 36. The first coupling 30 is connected to the lower part of the third tubular section 36, and the connector 28 is joined to the third tubular section 36 at substantially the same height as the location where the first coupling 30 is connected to the third tubular section 36.

Further, on an upper part of the third tubular section 36, a first meshing portion 62 is provided, having a plurality of teeth formed along the outer circumferential surface thereof. The teeth, which are triangular in cross section, are formed continuously and in radial convex/concave shapes on the first meshing portion 62, the teeth being in meshed engagement with the later-described handle 22.

Moreover, downwardly from the first meshing portion 62, a projection 64 is provided, which projects radially outward gradually in a downward direction (in the direction of the arrow A) with respect to the outer circumferential surface of the third tubular section 36. The projection 64 is formed in an annular shape along the outer circumferential surface of the third tubular section 36.

The first coupling 30 extends a predetermined length downwardly (in the direction of the arrow A), while being distanced by a predetermined interval in a radial outward direction with respect to the second and third tubular sections 34, 36 constituting the main body portion 26. Additionally, in the vicinity of a lower end of the first coupling 30, an o-ring 68 is installed thereon via an annular groove formed on the outer circumferential surface, together with an engagement groove 70 for engagement with the second body 18, the engagement groove 70 being formed slightly upward (in the direction of the arrow B) with respect to the annular groove.

On the other hand, the third through hole 42 of the third tubular section 36 opens upwardly (in the direction of the arrow B), and a nut 72 is engaged and fixed therein adjacent to a border location with the second through hole 40, and together therewith, a portion of the later-described handle 22 is inserted into an upper part of the third through hole 42. Additionally, the needle valve 24 of the valve mechanism 20 is screw-engaged with the nut 72.

The connector 28 extends in a horizontal direction perpendicularly with respect to the main body portion 26. The first port 12 opens therein in a direction away from the main body portion 26. More specifically, the connector 28 is formed to project a predetermined length laterally with respect to the main body portion 26.

A first connecting hole 74, which is reduced in diameter from the first port 12, is formed on a side of the main body portion 26 adjacent to the first port 12, and a second connecting hole 78, which is reduced in diameter from the first connecting hole 74, is formed adjacent to the first connecting hole 74 further toward the side of the main body portion 26. In addition, the second connecting hole 78 communicates with a communication passage 79, which is provided between the outer circumferential side of the main body portion 26 and the first coupling 30. A coupling mechanism 82, to which a fluid tube 80 is connected through which a pressure fluid is supplied, is provided in the first port 12.

The coupling mechanism 82 includes a chuck 84 that engages with the fluid tube 80 inserted in the first port 12, a guide 86 engaged with the inner circumferential surface of the first port 12, a release bush 88 displaceable along the guide 86, which releases an engaged state of the fluid tube 80 by the chuck 84, and a packing 90 for maintaining airtightness, which abuts against the first port 12 and the fluid tube 80.

The packing 90, for example, is formed with a T-shape in cross section from an elastic material such as rubber or the like, which is arranged in the interior of the first port 12 in abutment with a border location thereof with the first connecting hole 74.

Figure 5:
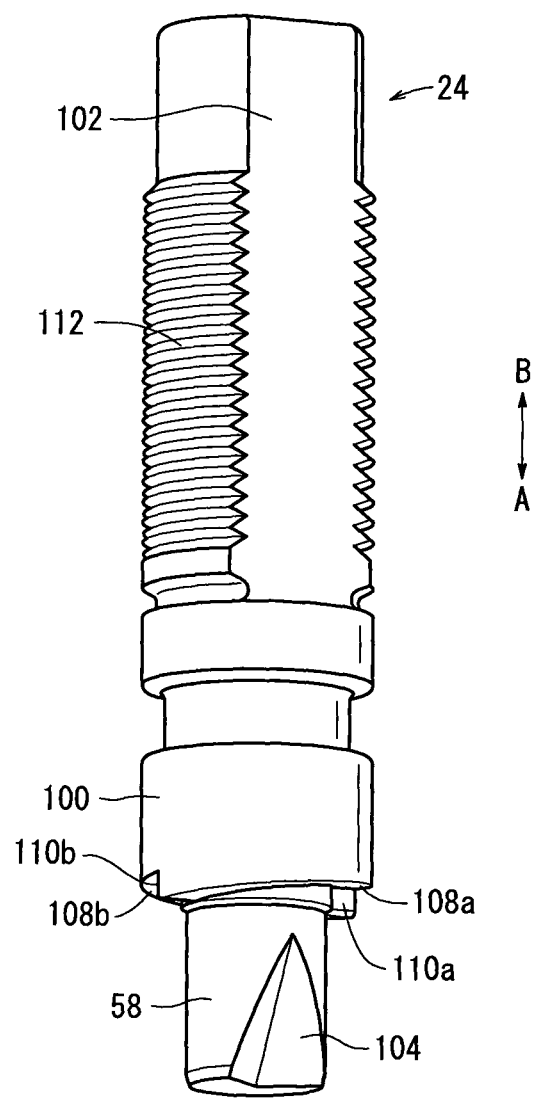
FIG. 5 is an exterior perspective view of the needle valve shown in FIG. 1.

The valve mechanism 20 includes the needle valve 24, which is inserted and displaced in the axial direction (the direction of arrows A and B) through the interior of the main body portion 26 that constitutes the first body 14. As shown in FIG. 5, the needle valve 24 is constituted from a shaft-like body, which is formed, for example, from a resin material having a predetermined length along the axial direction (in the direction of arrows A and B).

Further, the needle valve 24 includes a control section (valve member) 58 formed on a lower end thereof and which is capable of controlling the flow rate of a fluid, a seating section (valve member) 100 connected to an upper part of the control section 58 and which is capable of being seated on the seat 50 of the first body 14, and a shaft 102 formed on an upper part of the seating section 100 and which extends to the upper end side of the needle valve 24.

The control section 58 is inserted through the first through hole 38 and includes a cutout groove (groove) 104, which is cut with a triangular shape in cross section along the axial direction. The cutout groove 104 is formed such that a depth thereof from the outer circumferential surface of the control section 58 changes along the axial direction of the needle valve 24. The cutout groove 104 is formed with a maximum depth at a lower end of the control section 58, i.e., the lower end side (in the direction of the arrow A) of the needle valve 24, and the cutout groove 104 gradually narrows (in the direction of the arrow B) toward the side of the seating section 100 (see FIG. 2). Moreover, aside from the depth of the cutout groove 104 being changed along the axial direction, the cross sectional shape of the cutout groove 104 remains uniform, i.e., with a substantially triangular shape in cross section.

Stated otherwise, the cutout groove 104 is formed such that the cross sectional area thereof changes along the axial direction of the control section 58.

The seating section 100 is formed with a circular shape in cross section, is expanded in diameter radially outward with respect to the control section 58, and is inserted through the second through hole 40 of the first body 14. In addition, an o-ring 106 is mounted via an annular groove on an outer circumferential surface of the seating section 100, the o-ring 106 abutting against the inner circumferential surface of the second through hole 40. The o-ring 106 is installed at a position upwardly from the communication holes 60 (in the direction of the arrow B), when the lower surface of the seating section 100 is seated on the seat 50.

Further, second spiral surfaces 108a, 108b, which extend in spiral shapes along the axial direction of the needle valve 24, are formed on the lower surface of the seating section 100. The second spiral surfaces 108a, 108b are formed to confront the seat 50 and the first spiral surfaces 52a, 52b of the first body 14, and have a predetermined width in a diametrical direction on the lower surface. The second spiral surfaces 108a, 108b are inclined, for example, in a direction (the direction of the arrow A) toward the side of the control section 58, while turning counterclockwise about the axis of the seating section 100, and are formed as a pair symmetrically about the axis.

At borders between one of the second spiral surfaces 108a and the other of the second spiral surfaces 108b, a pair of second stopper walls (second walls) 110a, 110b are formed respectively in an upstanding manner in the axial direction (the direction of arrows A and B) of the seating section 100. The second stopper walls 110a, 110b are disposed at respective positions on a straight line about the axis of the needle valve 24.

Stated otherwise, one of the second stopper walls 110a and the other of the second stopper walls 110b are disposed at respective positions separated by 180 degrees from each other along the circumferential direction of the needle valve 24.

The needle valve 24 is inserted through the interior of the first body 14, and when the needle valve 24 is lowered, the second spiral surfaces 108a, 108b come into abutment respectively against the first spiral surfaces 52a, 52b, together with the first stopper walls 54a, 54b coming into abutment against the second stopper walls 110a, 110b.

The shaft 102 is formed with a predetermined length along the axial direction, and is inserted through the second and third through holes 40, 42. Threads 112 are engraved on the outer circumferential surface of the shaft 102. The threads 112 are screw-engaged with the nut 72 disposed in the interior of the main body portion 26.

The handle 22 is formed in a bottomed cylindrical shape having a disk-shaped base portion 114 on an upper part thereof, an outer wall portion 116 extending downwardly from an outer edge of the base portion 114, and an annular inner wall portion 118 extending downwardly from a central region of the base portion 114. The inner wall portion 118 is inserted into the interior of the third tubular section 36 of the first body 14. Further, an inner circumferential surface of the inner wall portion 118 has an oblong cross section, into which the shaft 102 of the needle valve 24 having an oblong cross section is inserted. Owing thereto, by rotation of the handle 22, and consequent rotation of the needle valve 24 including the shaft 102, the needle valve 24 is advanced and retracted along the axial direction (the direction of arrows A and B) of the main body portion 26.

In addition, the handle 22 is installed from an upper side of the main body portion 26 constituting the first body 14. The outer wall portion 116 and the inner wall portion 118 of the handle 22 are respectively mounted on an outer circumferential side and an inner circumferential side of the third tubular section 36.

Further, a second meshing section 122 is formed on a lower end of the outer wall portion 116, projecting in a radial inward direction from the inner circumferential surface of the outer wall portion 116 and having a plurality of teeth. The plural teeth of the second meshing section 122, which are triangular in cross section, are formed continuously and in radial convex/concave shapes, the teeth being held in meshing engagement with the first meshing section 62 formed on the upper part of the first body 14, for thereby regulating rotational displacement of the handle 22. The second meshing section 122 is disposed in a divided fashion at substantially equal angular intervals mutually along the circumferential direction of the handle 22.

The second body 18 is formed in a tubular shape, having an attachment 124 on a lower end, which is engraved with threads 132 on the outer circumferential surface thereof, a tightening section 126, which is hexagonal in cross section, formed on an upper part of the attachment 124, a second coupling 128 formed on an upper end adjacent to the tightening section 126 and which is connected to the first coupling 30 of the first body 14, and an insertion hole 130 that penetrates internally therethrough along the axial direction of the second body 18.

The attachment 124 is connected, for example, to a non-illustrated fluid pressure apparatus S through the threads 132 provided on the outer circumferential surface thereof. The second port 16 is formed with a substantially constant diameter in the interior of the attachment 124. The second port 16 is constituted as part of the insertion hole 130. In addition, the first tubular section 32 of the first body 14 is inserted into the second port 16.

Further, in the insertion hole 130, the check valve 44, which is installed on the first body 14, is expanded in diameter in a radial outward direction, coming into abutment with the inner circumferential surface of the insertion hole 130 at a location on an upper side (in the direction of the arrow B) of the second port 16.

The tightening section 126 is used, for example, when the flow rate control apparatus 10 is connected to another fluid pressure device using a non-illustrated tool. In addition, the insertion hole 130, which is formed in the interior of the connector 28, communicates with the second port 16, and extends upwardly while expanding gradually outward in diameter.

The inner circumferential surface of the second coupling 128 is expanded in diameter maximally in a radial outward direction, and a projection 134, which projects radially inward, is formed with an annular shape on the inner circumferential surface. Further, the inner diameter of the second coupling 128 is set to be substantially the same as the outer diameter of the first coupling 30. Additionally, when the second coupling 128 is installed to cover the outer circumferential side of the first coupling 30 of the first body 14, the projection 134 is inserted and latched in the engagement groove 70, and the inner circumferential surface of the second coupling 128 abuts against the outer circumferential surface of the first coupling 30.

Consequently, the first body 14 including the first coupling 30 is connected with respect to the second body 18 including the second coupling 128, and since relative displacement therebetween in the axial direction is regulated, and the first coupling 30 is fitted together with the second coupling 128, the main body portion 26 of the first body 14 is properly positioned coaxially with the second body 18.

Further, although relative displacement of the mutually connected first and second bodies 14, 18 is regulated in the axial direction (the direction of arrows A and B), the first and second bodies 14, 18 are connected together while enabling axial rotation thereof through engagement between the projection 134 and the engagement groove 70.

The flow rate control apparatus 10 according to the present invention is constructed basically as described above. Next, operations and effects of the flow rate control apparatus 10 shall be explained. As shown in FIG. 1, a completely closed condition, in which the needle valve 24 constituting the valve mechanism 20 is lowered under a rotary action of the handle 22, so that the seating section 100 of the needle valve 24 is seated on the seat 50, thereby blocking communication between the first port 12 and the second port 16, and additionally, a rotation-regulated state, in which the handle 22 is moved downward so that the first meshing section 62 and the second meshing section 122 are placed in meshing engagement, shall be described as an initial condition.

In the initial condition, for example, by supplying a pressure fluid to the second port 16 of the second body 18 from a non-illustrated pressure fluid device, the pressure fluid flows upwardly through the first through hole 38 of the first tubular section 32. In this case, the check valve 44 is disposed between the first body 14 and the second body 18, and the flange portion 46 thereof opens downwardly. Owing thereto, the pressure fluid is prevented from flowing downstream and passing between the first body 14 and the second body 18.

Then, after a non-illustrated operator moves the handle 22 upwardly (in the direction of the arrow B) along the axial direction, thereby releasing the condition in which rotational displacement of the needle valve 24 is regulated, the handle 22 is turned in a predetermined direction (in a counterclockwise direction as viewed from the side of the handle 22). As a result, while the needle valve 24 is rotated in threaded engagement with the nut 72, the needle valve 24 is displaced upwardly (in the direction of the arrow B) in the axial direction.

Consequently, at the same time that the seating section 100 of the needle valve 24 separates gradually away from its state of abutment with the seat 50, the cross sectional area of the passage 136 (see FIG. 2), which is formed between the inner circumferential surface of the first through hole 38 and the cutout groove 104 of the control section 58, is gradually enlarged. In addition, the pressure fluid, which has flowed through the passage 136 to the interior of the through hole 40, flows in a radial outward direction through the pair of communication holes 60, and is supplied to the communication passage 79. At this time, the flow rate of the pressure fluid is controlled in proportion to the cross sectional area of the passage 136 between the inner circumferential surface of the first through hole 38 and the cutout groove 104 of the needle valve 24.

Finally, after the pressure fluid has risen along the communication passage 79 and flows to the connector 28 of the first body 14, the pressure fluid flows at a desired flow rate to another fluid pressure device through the fluid tube 80 that is coupled to the connector 28 through the coupling mechanism 82. In addition, by the non-illustrated operator moving the handle 22 downwardly in the axial direction (the direction of the arrow A), thereby bringing the first meshing section 62 and the second meshing section 122 into meshed engagement with each other, further rotation of the handle 22 is regulated, resulting in a condition where rotational displacement of the needle valve 24 is restricted.

More specifically, the displacement amount in the axial direction (the direction of the arrow B) of the needle valve 24 is proportional to the flow rate of the pressure fluid, which flows through the communication holes 60 from the second port 16 to the side of the first port 12. Stated otherwise, the flow rate of the pressure fluid is controlled by controlling the displacement amount of the needle valve 24.

By further rotating the handle 22 and moving the control section 58 of the needle valve 24 to a position confronting the seat 50, the cross sectional area of the passage 136 is further enlarged, whereby the flow rate of the pressure fluid, which flows through the passage 136 from the second port 16 to the first port 12, can be increased.

Additionally, after the flow rate of the pressure fluid, which is controlled through the flow rate control apparatus 10, has been confirmed to have arrived at a desired flow rate by a non-illustrated flow rate meter, rotational movement of the handle 22 is regulated by the operator lowering the handle 22 to bring the first meshing section 62 and the second meshing section 122 into meshed engagement with each other. More specifically, a rotation-locked condition of the handle 22 is established.

Figure 6:
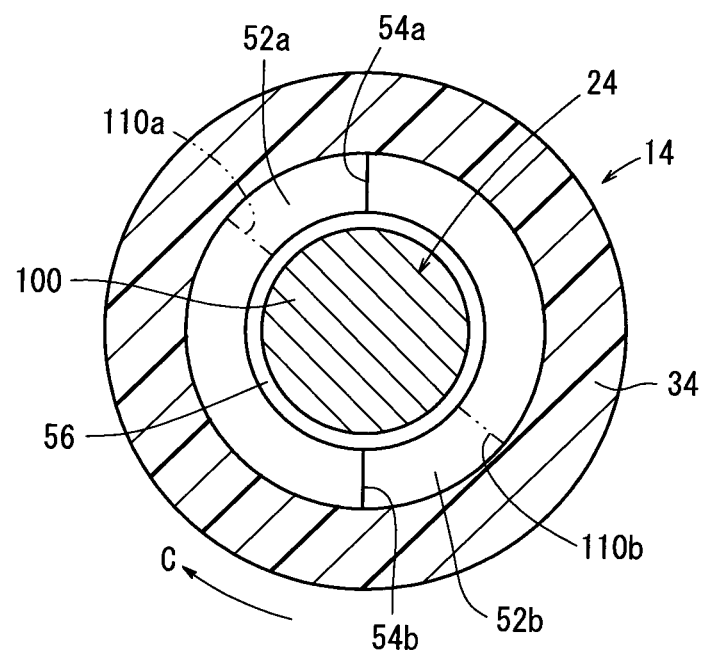
FIG. 6 is a cross sectional view taken along line VI-VI of FIG. 1.

On the other hand, in the case that the flow rate of the pressure fluid introduced through the fluid tube 80 from the first port 12 is to be reduced, then in a condition in which the pressure fluid is flowing from the aforementioned second port 16 to the first port 12, after the non-illustrated operator has gripped the handle 22 and moved the handle 22 upwardly again to released the rotation-locked condition thereof, the handle 22 is turned in a direction opposite to the aforementioned direction (i.e., clockwise as viewed from the side of the handle 22, or in the direction of the arrow C in FIG. 6). In addition, by rotating the needle valve 24 together with rotation of the handle 22, the needle valve 24 is moved downwardly (in the direction of the arrow A) along the main body portion 26 of the first body 14.

Consequently, the control section 58 of the needle valve 24 is displaced downward (in the direction of the arrow A) in the first through hole 38, whereby the cross sectional area of the passage 136, which is formed between the inner circumferential surface of the first through hole 38 and the cutout groove 104, becomes gradually smaller, and therefore, the flow rate of the pressure fluid that flows downstream through the passage 136 is reduced.

In addition, as the handle 22 is further rotated, the second spiral surfaces 108a, 108b of the seating section 100 on the needle valve 24 begin to come into contact with the first spiral surfaces 52a, 52b of the seat 50, whereupon the second stopper walls 110a, 110b of the seating section 100 abut respectively against the first stopper walls 54a, 54b of the seat 50. As a result, rotational displacement of the needle valve 24 is regulated, and the seating section 100 of the needle valve 24 abuts against the seat 50, to thereby bring about a completely closed condition.

More specifically, the seating section 100 of the needle valve 24 abuts against the seat 50, downward movement of the needle valve 24 (in the direction of the arrow A) is regulated, and communication between the first port 12 and the second port 16 through the communication holes 60 is blocked. At this time, a downwardly directed thrust force from the needle valve 24 is not applied in the axial direction (the direction of the arrow A), but rather, a force is applied in a circumferential direction by abutment of the first and second stopper walls 54a, 54b, 110a, 110b.

Owing thereto, once the completely closed condition of the flow rate control apparatus 10 is brought about, even in the event that an operator rotates the handle 22 excessively, as a result of mutual abutment between the first stopper walls 54a, 54b and the second stopper walls 110a, 110b, the needle valve 24 is not pressed further downward (in the direction of the arrow A) from the initial state of abutment of the needle valve 24 with the seat 50, and thus deformation of the first body 14 including the seat 50 by the needle valve 24 can reliably be prevented.

Stated otherwise, by regulating rotational displacement of the needle valve 24, the first stopper walls 54a, 54b of the first body 14 function as a stopper means for regulating further downward displacement of the needle valve 24 in an axial direction from the completely closed condition.

The aforementioned first and second stopper walls 54a, 54b, 110a, 110b are not limited to a case of being disposed in respective pairs, but rather, one each of such stopper walls may be provided respectively. More specifically, the first stopper walls 54a, 54b and the second stopper walls 110a, 110b may be provided in the same quantity, so long as the stopper walls include the function of being able to regulate rotational motion of the needle valve 24.

In the foregoing manner, according to the present embodiment, the pair of second stopper walls 110a, 110b, which are formed substantially in parallel with the axial direction (the direction of arrows A and B) of the seating section 100, are provided on the seating section of the needle valve 24 that constitutes the valve mechanism 20, and together therewith, the pair of first stopper walls 54a, 54b, which are formed substantially in parallel with the axial direction of the first body 14, are provided on the seat 50 that comes into abutment with the seating section 100. Owing thereto, when the needle valve 24 is lowered by rotation thereof to result in a completely closed state, the second stopper walls 110a, 110b come into abutment against the first stopper walls 54a, 54b, whereby rotational displacement of the needle valve 24 is regulated, and a completely closed condition is maintained, in which communication between the first port 12 and the second port 16 is blocked completely.

More specifically, a pressing force is applied in a circumferential direction with respect to the first stopper walls 54a, 54b, without any thrust force in a downward axial direction (in the direction of the arrow A) caused by rotation of the needle valve 24 being applied with respect to the seating section 100.

As a result, the seating section 100 is prevented from being pressed in an axial direction (the direction of the arrow A) by pressure applied from the needle valve, and therefore, even in the case that the aforementioned first body 14 and the needle valve 24 are formed from a resin material, which is lower in hardness than a metal material, deformation (i.e., depression or caving in) and wearing of the seating section 100 can be avoided, while at the same time, changes in the completely closed position of the needle valve 24 due to deformation of the seating section 100 can reliably be prevented. Owing thereto, the flow rate of the pressure fluid can be controlled stably and with high accuracy at all times, without detrimental changes in the completely closed position by the needle valve 24.

Further, because the needle valve 24 and the first body 14 are formed from a resin material, compared to the conventional flow rate control apparatus in which the needle valve and the body are formed from a metal material, the weight thereof can be reduced, or stated otherwise, the needle valve 24 and the first body 14 can be made lighter in weight.

Furthermore, by providing the cross sectional triangular shaped cutout groove 104 on the control section 58 of the needle valve 24, the flow rate of pressure fluid through the flow passage 136, which is formed between the cutout groove 104 and the first body 14, can be controlled easily and highly accurately.

Still further, by providing the guide member 56, which projects in a radial inward direction on the inner circumferential surface of the first through hole 38 in sliding contact with the control section 58 of the needle valve 24, the needle valve 24 is guided reliably and highly accurately upon displacement thereof in the axial direction.

The flow rate control apparatus according to the present invention is not limited to the above-described embodiment. It should be understood that various additional or modified structures could be adopted therein without departing from the scope of the invention as set forth in the appended claims.

The invention claimed is:

1. A flow rate control apparatus, which is capable of controlling the flow rate of a fluid that flows between a pair of ports, by displacement of a rod having a valve member thereon in an axial direction, comprising:
a body having the ports and a seat on which the valve member is seated, the rod being screw-engaged rotatably in the body; and
a stopper disposed on the body and the rod, and which regulates rotational displacement of the rod in a valve-closed state in which the valve member is seated on the seat, wherein the body and the rod are both formed from a resin material, wherein the stopper comprises first walls formed substantially parallel with an axis of the body and adjacent to said seat, and second walls disposed on the rod and formed substantially parallel with an axis of the rod, wherein rotational displacement of the rod is regulated by abutment of the first walls against the second walls, and
wherein the valve member shuts off the flow of fluid between the pair of ports before the rod is displaced in the axial direction to the valve-closed state in which the valve member is seated on the seat, and wherein the abutment of the first and second walls of the stopper stops rotation of the rod toward the valve-closed state after the valve member shuts off the flow of fluid between the pair of ports and before the rod is displaced in the axial direction to the valve-closed state in which the valve member is seated on the seat.

2. The flow rate control apparatus according to claim 1, wherein the stopper comprises spiral surfaces, which are adjacent respectively to the first walls and the second walls, and which are formed in spiral shapes circumferentially leading in a direction away from the first walls, the spiral surfaces being inclined gradually in a direction of rotation of the rod which is being brought into the valve-closed state.

3. The flow rate control apparatus according to claim 1, wherein the valve member includes a groove, the cross sectional area of which changes in the axial direction, thereby forming a passage between an inner wall surface of the body and the groove, wherein the passage leads to a through-hole in the body.

4. The flow rate control apparatus according to claim 3, wherein the cross sectional area of the groove becomes greater in accordance with movement of the rod in a valve-opening direction.

5. The flow rate control apparatus according to claim 3, wherein the groove is triangularly shaped in cross section.

6. The flow rate control apparatus according to claim 1, wherein the body comprises a guide member provided in a hole through which the rod is inserted, and which displaceably supports the rod for displacement in the axial direction.

7. The flow rate control apparatus according to claim 1, wherein the second walls are formed as a pair, one of the second walls and another of the second walls being disposed at positions separated by 180 degrees in the circumferential direction of the rod.

* * * * *